(12) United States Patent
Koch et al.

(10) Patent No.: US 9,764,685 B2
(45) Date of Patent: Sep. 19, 2017

(54) DISPLAY DEVICES

(71) Applicants: DENSO International America, Inc., Southfield, MI (US); DENSO CORPORATION, Kariya-shi, Aichi-ken (JP)

(72) Inventors: Michael Koch, New Hudson, MI (US); Ryo Kunitachi, Novi, MI (US); Brandon Peterson, Farmington Hills, MI (US); Ramesh Mishra, Troy, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 181 days.

(21) Appl. No.: 14/876,348

(22) Filed: Oct. 6, 2015

(65) Prior Publication Data
US 2017/0096097 A1    Apr. 6, 2017

(51) Int. Cl.
*G01D 13/04* (2006.01)
*B60K 35/00* (2006.01)
*B60Q 3/04* (2006.01)

(52) U.S. Cl.
CPC .............. B60Q 3/044 (2013.01); B60K 35/00 (2013.01); G01D 13/04 (2013.01); *B60K 2350/102* (2013.01); *B60K 2350/203* (2013.01); *B60K 2350/402* (2013.01); *B60K 2350/94* (2013.01)

(58) Field of Classification Search
CPC .............. B60K 35/00; B60K 2350/203; B60K 2350/402; B60K 2350/94; G01D 11/16; G01D 11/24; G01D 13/00; G01D 13/02; G01D 13/04
USPC .................................................. 116/305, 334
See application file for complete search history.

(56) References Cited

U.S. PATENT DOCUMENTS 5,415,124 A * 5/1995 Simon et al. .......... G01D 13/04
                                                            116/334
7,431,373 B2  10/2008 Munro
7,926,963 B2   4/2011 Konagaya et al.

FOREIGN PATENT DOCUMENTS

| JP | 2006003341 A |   | 1/2006  |              |
|----|--------------|---|---------|--------------|
| JP | 2010112710 A | * | 5/2010  | ... G01D 13/04 |
| JP | 2011203182 A | * | 10/2011 | ... G01D 13/04 |
| JP | 2015064287 A | * | 4/2015  | ... G01D 13/04 |
| JP | 2015230275 A | * | 12/2015 | ... G01D 11/24 |

* cited by examiner

*Primary Examiner* — R. A. Smith
(74) *Attorney, Agent, or Firm* — Harness, Dickey & Pierce, P.L.C.

(57) ABSTRACT

A frame member of an instrument cluster assembly. The frame member includes a base portion, a first wing extending from a first side of the base portion, and a second side of the base portion that is opposite to the first side. A display overlapping portion extends from the base portion between the first side and the second side, and is configured to be mounted to a display area of a dial sheet that the frame member is coupled to. The first wing is configured to restrict bending of the dial sheet that the frame member is coupled to.

20 Claims, 4 Drawing Sheets

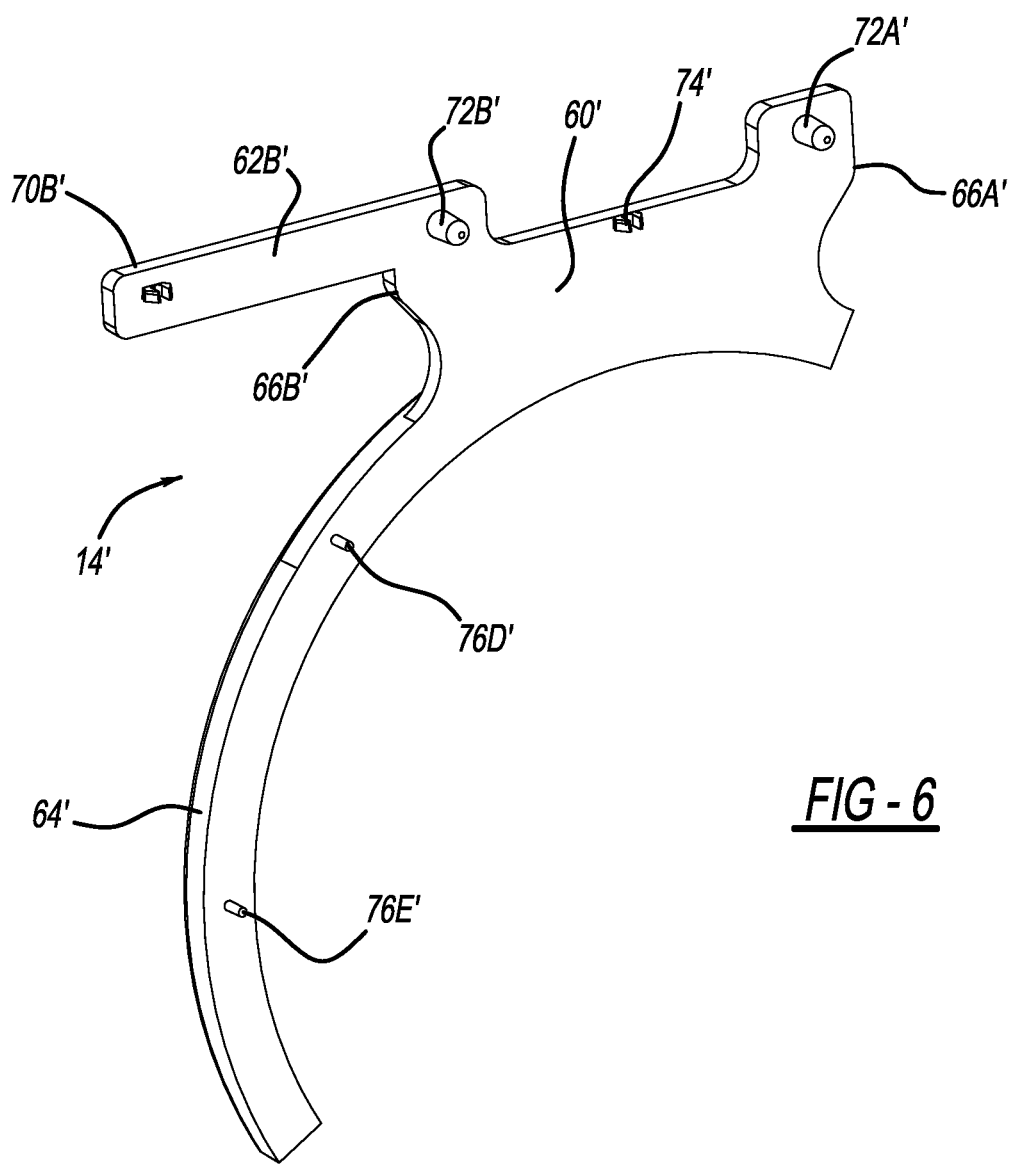

“DISPLAY DEVICES”

FIELD

The present disclosure relates to display devices.

BACKGROUND

This section provides background information related to the present disclosure, and is not necessarily prior art.

It is becoming increasingly common for vehicle instrument cluster assemblies to include a display screen, such as a thin-film-transistor (TFT) liquid-crystal display (LCD) screen that is visible through a transparent dial sheet. Such TFT LCD display screens often display traditional dial instruments, such as the speedometer. To facilitate viewing of the display screen and to enhance the appearance of the instrument cluster assembly, one or more frame members, often including circular or semicircular rings, are overlaid onto the dial sheet and secured thereto with heat staking.

While such dial sheets and frame members are suitable for their intended use, they are subject to improvement. For example, it would be desirable to have an improved frame member that helps prevent the dial sheet from bending, thereby protecting the heat staking securing the frame member to the dial sheet. Furthermore, a dial sheet that reduces the visibility of non-illuminated indicators on the dial sheet would be desirable in order to enhance the appearance of the dial sheet and prevent the driver from being distracted by non-illuminated indicators that may be visible, particularly in bright sunlight.

SUMMARY

This section provides a general summary of the disclosure, and is not a comprehensive disclosure of its full scope or all of its features.

The present teachings provide for a frame member of an instrument cluster assembly. The frame member includes a base portion, a first wing extending from a first side of the base portion, and a second side of the base portion that is opposite to the first side. A display overlapping portion extends from the base portion between the first side and the second side, and is configured to be mounted to a display area of a dial sheet that the frame member is coupled to. The first wing is configured to restrict bending of the dial sheet that the frame member is coupled to.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a rear perspective view of another upper frame member according to the present teachings.

Corresponding reference numerals indicate corresponding parts throughout the several views of the drawings.

DETAILED DESCRIPTION

Example embodiments will now be described more fully with reference to the accompanying drawings.

Figure 1:
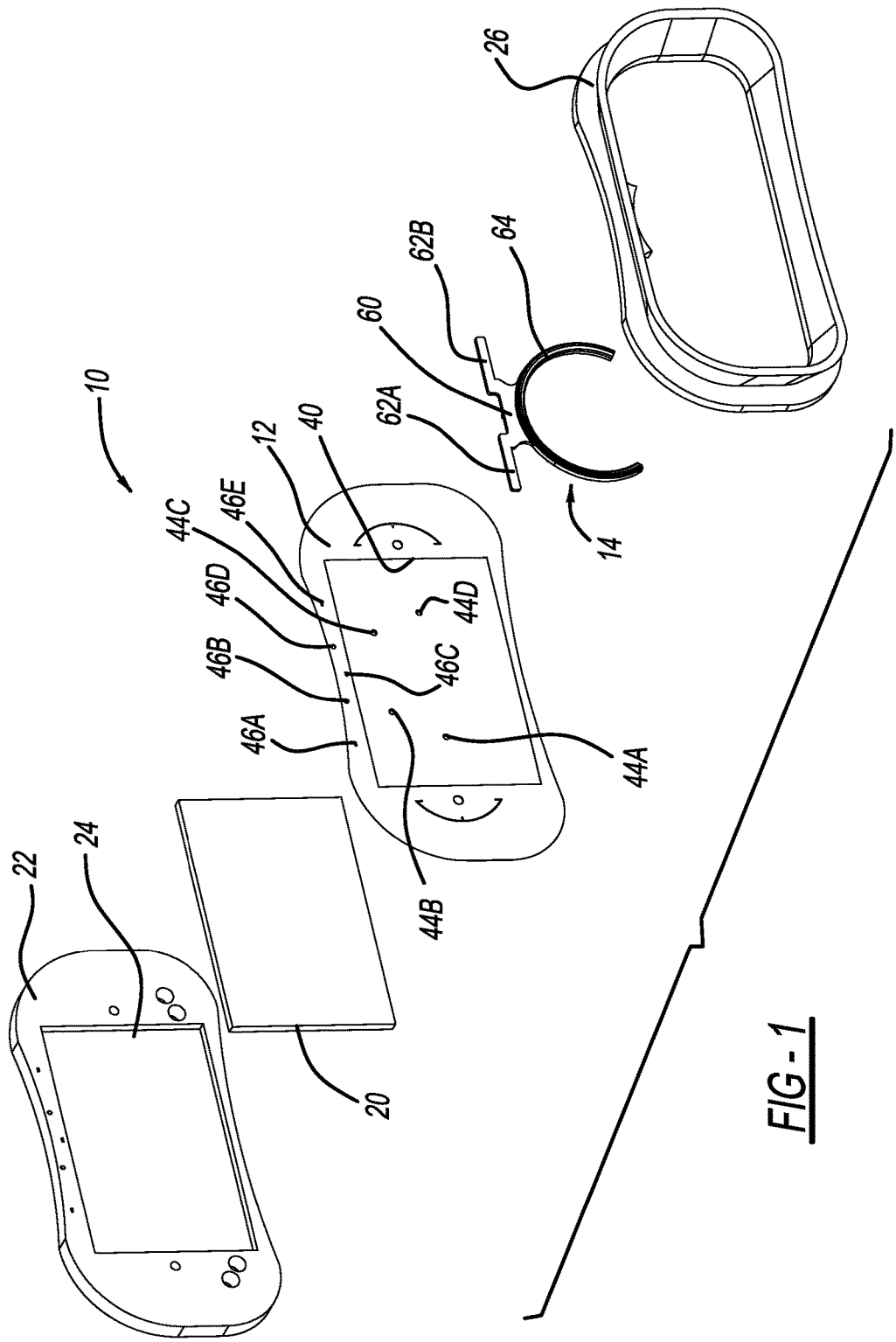
FIG. 1 is an exploded view of an exemplary instrument cluster assembly according to the present teachings.

With initial reference to FIG. 1, an instrument cluster assembly according to the present teachings is generally illustrated at reference numeral 10. The instrument cluster assembly 10 generally includes a dial sheet 12, an upper frame member 14 configured to be mounted to the dial sheet 12, a display screen 20 visible through the dial sheet 12, a printed circuit board 22 including a recess 24 configured to receive the display screen 20 therein, and a frame 26. The instrument cluster assembly 10 can be used to display instrument readings or any other information pertinent to any suitable vehicle, such as an automobile, mass transit vehicle, aircraft, military vehicle, watercraft, train, construction vehicle, shipping vehicle, etc. Furthermore, the instrument cluster assembly 10 can be used to display information relevant to the operation of any type of machinery, such as industrial machinery including manufacturing equipment, or any type of system, such as a building HVAC system, security system, fire prevention system, etc.

The frame 26 is configured to be mounted to the printed circuit board 22 with the dial sheet 12, the upper frame member 14, and the display screen 20 therebetween. The frame 26 can include a transparent window plate covering the dial sheet 12 with the upper frame member 14 coupled thereto. The display screen 20 can be any suitable display screen, such as a thin-film-transistor (TFT) liquid-crystal display (LCD) screen.

Figure 2:
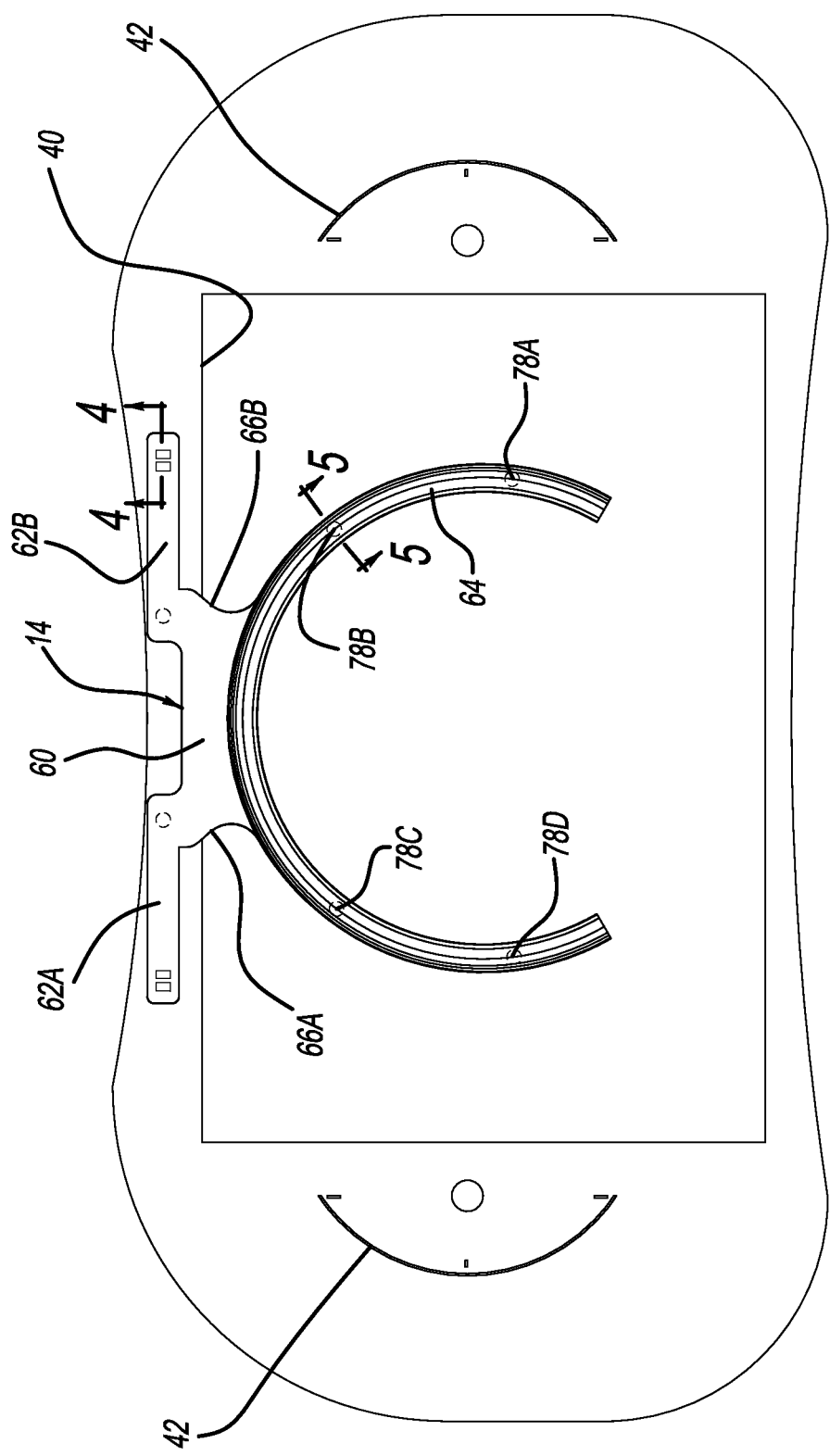
FIG. 2 is a plan view of upper and lower frame members of the instrument cluster assembly of FIG. 1 mounted to a dial sheet of the instrument cluster assembly of FIG. 1.

With continued reference to FIG. 1 and additional reference to FIG. 2, the dial sheet 12 will now be described in detail. The dial sheet 12 can be any suitable transparent (or semi-transparent) sheet defining a display area 40 through which the display screen 20 can be viewed. The dial sheet 12 further includes a plurality of indicators 42, which can be illuminated in order to identify the existence of various conditions and/or various warnings to an operator of the vehicle.

The indicators 42 can be formed in any suitable manner. For example, the dial sheet 12 can be a clear sheet without pigmentation and with black ink smoke-printed thereon in a manner that outlines the various indicators 42. Alternatively, the present teachings advantageously provide for the dial sheet 12 as a smoked polycarbonate (PC) sheet having a smoke/grey tint thereto. Any suitable smoked PC sheet can be used as long as the PC sheet is manufactured to have a smoke or gray color. For example, the dial sheet 12 can be a gray colored extruded film, such as a gray colored extruded film based on the polycarbonate Makrolon® from Bayer MaterialScience AG of Leverkusen, Germany. Any suitable Makrofol® film can be used, such as Makrofol® LM 296 1-2 760250. To define (e.g., outline) the indicators 42, the Makrofol® sheet includes any suitable black ink printed thereon in areas surrounding the different indicators 42 where light transmittance through the dial sheet 12 is not desired.

Use of Makrofol® film for the dial sheet 12, or any other suitable PC sheet manufactured with a smoke or gray color, is advantageous for a variety of reasons. For example, such a dial sheet 12 has a more consistent transmissivity, particularly at the display area 40. Furthermore, use of a dial sheet 12 manufactured with a smoke or gray appearance can hide the appearance of the indicators 42 when not illuminated due to a low contrast ratio between the non-illuminated indicators 42 and the surrounding areas of the dial sheet 12 blacked out with black ink. Light passing through the dial sheet 12 is cut by transmissivityand light reflecting back out of the sheet 12 is cut by transmissivityagain, thereby doubling the effectiveness of the transmissivityon contrast ratio of the dial sheet 12.

As illustrated in FIG. 1, the dial sheet 12 further includes a plurality of display area apertures 44A-44D defined by the dial sheet 12 at the display area 40. The display area apertures 44A-44D are configured for retention of the upper frame member 14 (particularly display overlapping portion 64 thereof) to the display area 40 in any suitable manner, such as with heat stakes 78A-78D (FIG. 2). The dial sheet 12 also defines a plurality of apertures 46A-46E, which facilitate retention of the upper frame member 14 to the dial sheet 12. Mounting of the upper frame member 14 to the dial sheet 12 is described further herein.

With continued reference to FIGS. 1 and 2 and additional reference to FIG. 3, the upper frame member 14 will now be described in detail. The upper frame member 14 generally includes a base 60, a first wing 62A, a second wing 62B, and a display overlapping portion 64 (also referred to herein as a curved portion 64) configured to be mounted to the display area 40. The first wing 62A extends from a first side 66A of the base 60, and the second wing 62B extends from a second side 66B of the base 60. The first and second wings 62A and 62B are generally coplanar with one another, as well as with the base 60. The curved portion 64 extends from a portion of the base 60 between the first and second sides 66A and 66B. The curved portion 64 is illustrated as being generally semi-circular, but the curved portion 64 can have any other suitable shape, such as any suitable curved or non-curved shape. For example, the curved portion 64 can be a fully circular portion, a square portion, or can include a plurality of linear portions.

Figure 3:
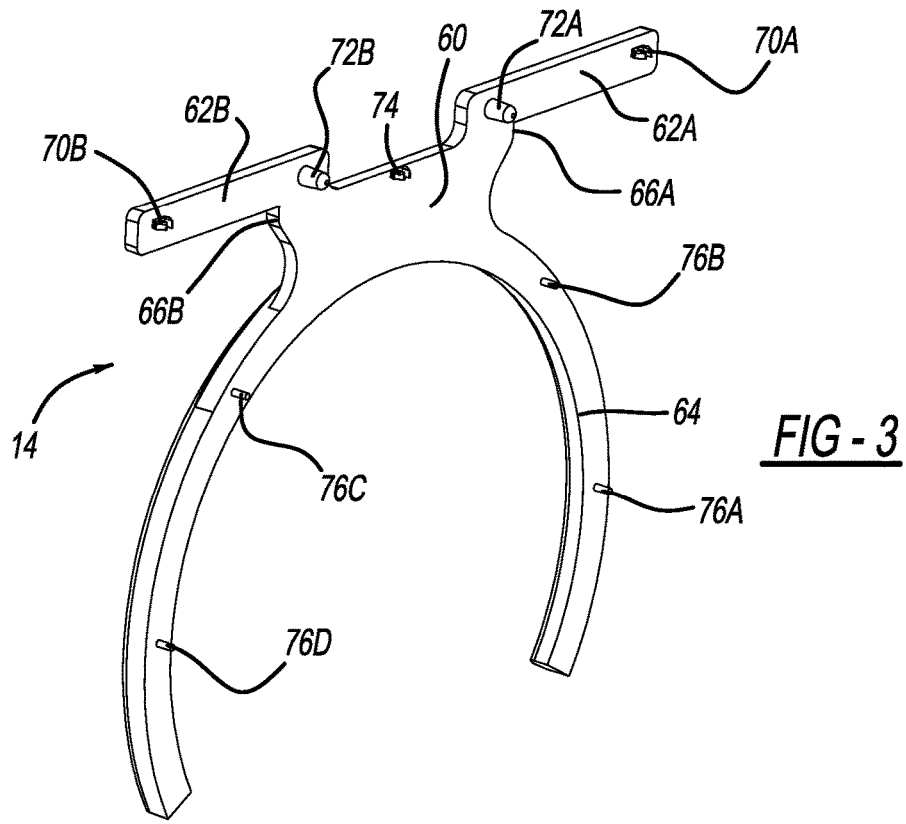
FIG. 3 is a rear perspective view of the upper frame member of the instrument cluster assembly of FIG. 1.
Figure 4:
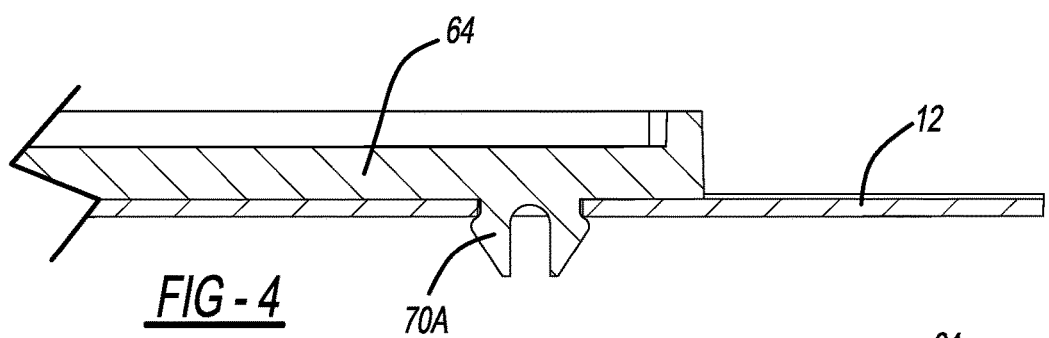
FIG. 4 is a cross-sectional view taken along line 4-4 of FIG. 2.

With particular reference to FIG. 3, the first wing 62A includes a first wing connector 70A, and the second wing 62B includes a second wing connector 70B. The upper frame member 14 further includes a first protrusion or knob 72A and a second protrusion or knob 72B. The first protrusion or knob 72A is proximate to where the first wing 62A extends from the base 60, and the second protrusion or knob 72B is proximate to where the second wing 62B extends from the base 60. The base 60 further includes a base connector 74, which is generally between the first and second knobs 72A/72B. The curved portion 64 includes a plurality of posts 76A-76D extending therefrom, which can be heat staked to the display area 40 of the dial sheet 12.

The first and second wing connectors 70A and 70B, and the base connector 74, can be any suitable coupling members. For example, the first and second wing connectors 70A and 70B and the base connector 74 can each include a pair of flexible tabs spaced apart from one another, which are configured to compress towards one another and then expand when inserted through the apertures 46A, 46C, 46E of the dial sheet 12 in order to "lock" the first and second wing connectors 70A/70B and the base 60 to the dial sheet 12.

To secure the upper frame member 14 to the dial sheet 12, the first and second knobs 72A/72B are inserted through the apertures 46B and 46D respectively in order to facilitate alignment of the connectors 70A, 70B, and 74 with the apertures 46A, 46C, and 46E respectively of the dial sheet 12, and to facilitate positioning of the curved portion 64 on the display area 40. The first wing connector 70A is inserted through the first aperture 46A of the dial sheet 12, and the second wing connector 70B is inserted through the aperture 46E defined in the dial sheet 12 to "lock" the first and second wings 62A and 62B and the base 60 to the dial sheet 12. To further secure the base 60 to the dial sheet 12, the base connector 74 is inserted through the aperture 46C.

Figure 5:
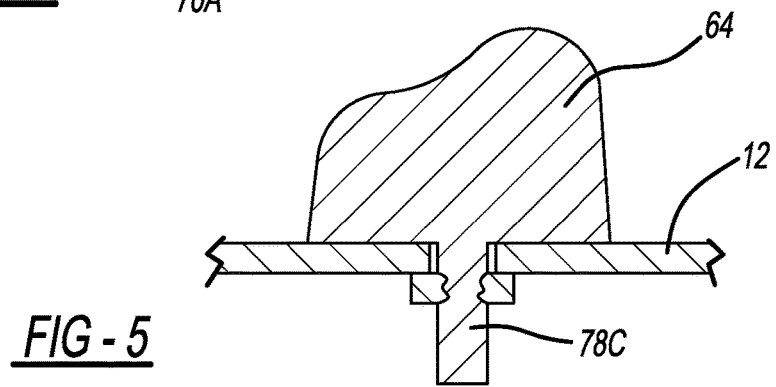
FIG. 5 is a cross-sectional view taken along line 5-5 of FIG. 2.

To secure the curved portion 64 to the display area 40, the posts 76A-76D are inserted through the display area apertures 44A-44D respectively and secured therein in any suitable manner, such as by heat staking. With reference to FIGS. 2 and 5, the heat staking is illustrated at reference numerals 78A-78D. Any suitable heat staking can be used in order to deform the posts 76A-76D in a manner that will prevent the posts 76A-76D from passing back through the display area apertures 44A-44D.

The first and second wings 62A and 62B provide numerous advantages. For example, the first and second wings 62A and 62B help prevent bending of the dial sheet 12 towards the upper frame member 14, which can undesirably damage the heat staking 78A-78D, and thus may result in decoupling of the curved portion 64 from the display area 40. Furthermore, the connections between the first wing connector 70A, the second wing connector 70B, and the base connector 74 with the dial sheet 12 helps to prevent bending of the dial sheet 12 away from the upper frame member 14, which may undesirably damage the heat staking 78A-78D.

With additional reference to FIG. 6, another upper frame member according to the present teachings is illustrated at reference numeral 14'. The upper frame member 14' is similar to the upper frame member 14 (similar features are illustrated with the same reference numbers but include the prime (') symbol), except that the upper frame member 14' includes only the second wing 62B' (not the first wing 62A), and includes less than an entirety of the display overlapping portion 64 (curved portion 64). Specifically, unlike the display overlapping portion 64, the display overlapping portion 64' terminates after extending only slightly from the first side 66A' of the base 60'. Although FIG. 6 illustrates the upper frame member 14' as only including the second wing 62B', the upper frame member 14' can include only the first wing 62A instead of the second wing 62B'. Further, although FIG. 6 illustrates the display overlapping portion 64' as terminating just slightly beyond the first side 66A' of the base 60', the display overlapping portion 64' can be configured to extend further beyond the first side 66A' as the display overlapping portion 64 does, and terminate just prior to extending beyond the second side 66B'. The display overlapping portion 64' can be any other suitable size or shape, and need not be curved.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An instrument cluster assembly comprising:
   a frame member including a base portion, a first wing extending from a first side of the base portion, and a display overlapping portion extending from the base portion between the first side and a second side that is opposite to the first side, the display overlapping portion is configured to be mounted to a display area of a dial sheet that the frame member is coupled to;
   wherein the first wing is configured to restrict bending of the dial sheet that the frame member is coupled to.

2. The instrument cluster assembly of claim 1, further comprising a second wing extending from the second side of the base portion, the second wing configured to restrict bending of the dial sheet that the frame member is coupled to.

3. The instrument cluster assembly of claim 2, further comprising:
   a first wing connector extending from the first wing and configured to couple the first wing to the dial sheet; and
   a second wing connector extending from the second wing and configured to couple the second wing to the dial sheet.

4. The instrument cluster assembly of claim 3, wherein each one of the first wing connector and the second wing connector include a pair of flexible tabs.

5. The instrument cluster assembly of claim 1, further comprising heat stakes coupling the display overlapping portion to the display area of the dial sheet.

6. The instrument cluster assembly of claim 1, wherein the frame member is coupled to the dial sheet and positioned such that the frame member overlays a display screen of the instrument cluster assembly.

7. The instrument cluster assembly of claim 1, wherein the display overlapping portion is curved.

8. The instrument cluster assembly of claim 1, further comprising:
   a first knob extending from the base portion proximate to the first wing and configured to be received by a first knob aperture defined by the dial sheet; and
   a second knob extending from the base portion proximate to a second wing and configured to be received by a second knob aperture defined by the dial sheet.

9. The instrument cluster assembly of claim 1, further comprising the dial sheet;
   wherein the dial sheet is a grey extruded film including black ink thereon outlining instrument cluster indicators configured to be illuminated by the instrument cluster assembly.

10. An instrument cluster assembly comprising:
    a dial sheet including a display area through which a display screen is viewable; and
    a frame member coupled to the dial sheet, the frame member including a first wing mounted to the dial sheet, a second wing mounted to the dial sheet, and a display overlapping portion mounted to the display area of the dial sheet.

11. The instrument cluster assembly of claim 10, wherein the dial sheet further includes a grey extruded film with black ink thereon outlining instrument cluster indicators configured to be illuminated.

12. The instrument cluster assembly of claim 10, wherein the display overlapping portion is mounted to the display area with heat staking.

13. The instrument cluster assembly of claim 10, wherein the display overlapping portion is semi-circular.

14. The instrument cluster assembly of claim 10, wherein each one of the first wing and the second wing is coupled to the dial sheet with a pair of flexible tabs.

15. The instrument cluster assembly of claim 10, wherein the first wing extends from a first side of a base portion and the second wing extends from a second side of the base portion opposite to the first side; and wherein the display overlapping portion extends further beyond the first side than beyond the second side.

16. An instrument cluster assembly comprising:

a dial sheet including: a grey extruded film with black ink thereon outlining instrument cluster indicators configured to be illuminated; and a display area through which a display screen is viewable; and a frame member coupled to the dial sheet, the frame member including a base portion, a first wing extending from a first side of the base portion and mounted to the dial sheet, a second wing extending from a second side of the base portion opposite to the first side and mounted to the dial sheet, and a curved portion extending from the base portion and mounted to the display area of the dial sheet with heat staking;

wherein each one of the wings is coupled to the dial sheet to prevent the dial sheet from bending away from, and bending towards, the frame member.

17. The instrument cluster assembly of claim 16, wherein each one of the first wing and the second wing is coupled to the dial sheet with a pair of flexible tabs.

18. The instrument cluster assembly of claim 16, wherein the curved portion is semi-circular.

19. The instrument cluster assembly of claim 16, further comprising:

a first knob extending from the base portion proximate to the first wing and configured to be received by a first knob aperture defined by the dial sheet; and a second knob extending from the base portion proximate to the second wing and configured to be received by a second knob aperture defined by the dial sheet.

20. The instrument cluster assembly of claim 16, wherein each one of the first wing and the second wing extends parallel to the dial sheet.

* * * * *